(12) United States Patent
Behmenburg

(10) Patent No.: US 6,824,145 B2
(45) Date of Patent: Nov. 30, 2004

(54) LEVEL ADJUSTING UNIT WITH A COMPRESSED AIR RESERVOIR AND A TIRE INFLATION CONNECTOR

(75) Inventor: Christof Behmenburg, Lauenau (DE)

(73) Assignee: Continental Aktiengesellschaft, Hannover (DE)

( * ) Notice: Subject to any disclaimer, the term of this patent is extended or adjusted under 35 U.S.C. 154(b) by 127 days.

(21) Appl. No.: 10/240,823
(22) PCT Filed: Feb. 24, 2001
(86) PCT No.: PCT/EP01/02132
§ 371 (c)(1),
(2), (4) Date: Oct. 7, 2002
(87) PCT Pub. No.: WO01/76898
PCT Pub. Date: Oct. 18, 2001

(65) Prior Publication Data
US 2003/0047853 A1 Mar. 13, 2003

(51) Int. Cl.⁷ .................. B60C 23/14; B60G 11/27; B60G 17/00
(52) U.S. Cl. .............. 280/6.157; 280/124.16; 152/416
(58) Field of Search ............. 280/5.514, 6.157, 280/6.159, 124.16, 124.161; 152/416; 141/38; 340/442; 267/64.16, 64.19, 64.21

(56) References Cited

U.S. PATENT DOCUMENTS 4,640,331 A * 2/1987 Braun et al. ............. 152/416
5,467,595 A 11/1995 Smith
6,332,623 B1 * 12/2001 Behmenburg et al. . 280/124.16

FOREIGN PATENT DOCUMENTS

| DE | 35 42 975 | 6/1987 |
|---|---|---|
| DE | 195 28 852 | 2/1997 |
| EP | 0 943 470 | 9/1999 |
| EP | 0 978 397 | 2/2000 |
| JP | 55 015321 | 2/1980 |
| WO | WO 9319959 | 10/1993 |

* cited by examiner

Primary Examiner—Peter C. English
(74) Attorney, Agent, or Firm—Walter Ottesen

(57) ABSTRACT

The invention relates to a level adjusting system for motor vehicles, with a compressed air reservoir (26) and a tire inflation connector (28), in which a spare wheel can be connected. The spare wheel can be inflated from the compressed air reservoir (26) with the aid of the controllable distribution valve (36), the pneumatically controllable distribution valve (18), which bridges the non-return valve (10), the air dryer (6) and the pneumatically controllable valve (20) which also connects the compressed air line (22). The spare wheel may also be inflated with the aid of the compressor (2) and the pneumatically controllable distribution valve (20). During the inflation process the compressed air line (22) is closed with the aid of the controllable distribution valve (24) so that no compressed air escapes into the atmosphere.

8 Claims, 5 Drawing Sheets

LEVEL ADJUSTING UNIT WITH A COMPRESSED AIR RESERVOIR AND A TIRE INFLATION CONNECTOR

This application is the national stage of PCT/EP01/02132, filed Feb. 24, 2001 designating the U.S.

FIELD OF THE INVENTION

The invention relates to a level control system for vehicles having air springs. Such a level control system is known, for example, from DE 35 42 975 A1.

BACKGROUND OF THE INVENTION

Modern motor vehicles have many safety systems of which each takes up space in the motor vehicle so that space is tightly measured. For this reason, the effort is great to configure even necessary components of the motor vehicle as compact as possible. Accordingly, for example, in the recent past, it has been suggested that the spare tire of a motor vehicle be configured as a folding tire which is basically not filled with compressed air and is, instead, only filled or inflated as required. According to statutory requirements which are present in some countries, the full pressure in the folding wheel has to be reached within a certain time span in the case of need.

The compressor of the level control system of the motor vehicle can be used for pumping of the folding wheel. It has, however, been shown that the pregiven time span, within which the folding wheel must be pumped up, can only be maintained by accepting a long compressor running time and a high compressor temperature. If at the start of pumping up, the compressor temperature is already increased, for example, because of an increased ambient temperature, or the folding wheel has a large air volume (as is the case, for example, in off-road vehicles), it can happen that the compressor becomes destroyed during the fill-up operation of the folding wheel because of overheating.

SUMMARY OF THE INVENTION

It is a task of the invention to provide a level control system with which filling up or inflating a spare ti e is possible within a short time span without the compressor becoming greatly heated or destroyed.

As a controllable valve which switches the check valve, the following is to be understood: the check valve lies in a pressurized air line and the controllable valve lies in an additional pressurized air line which branches off from the first pressurized air line ahead of the check valve and is returned again to the additional pressurized air line rearward of the check valve. The check valve lies in the first pressurized air line. With the controllable valve, the additional pressurized air line can be switched clear (then the check valve is bridged) in one switching state or be blocked in another switching state.

An advantage of the invention is that the spare wheel can be filled with the aid of the compressor as well as wit the aid of the compressed air reservoir. If the temperature at he compressor is above a limit value ahead of the fill-up operation or exceeds the limit value during the fill-up operation, then the fill-up operation is carried out or is continued exclusively by the compressed air reservoir (the temperature of the compressor is monitored by the control unit of the level control system in a manner known per se). In this way, an overheating or a destruction of the compressor cannot occur because of the fill-up operation and the limited fill-up time can be maintained even for large spare wheels. A further advantage of the invention is that during the filling up of the spare wheel with the aid of the compressor, the compressed air is not conducted via the air dryer of the level control system. This advantage of the invention will be understood when one considers the following: the air, which is transferred from the compressor into the spare wheel, is taken from the level control system because the spare wheel is decoupled from the level control system after the fill-up operation and is used on the motor vehicle. If the pare wheel is filled up with the aid of the compressor via the air dryer. then the air dryer becomes moist and has to be regenerated. Since, for the regeneration, the air in the spare wheel is no longer available because the air is taken from the level control system (and not discharged from the spare wheel via the air dryer into the atmosphere), the regeneration of this moisture must take place with the aid of the remaining air in the level control system. It has been shown that the air, which is available in the level control system, is not sufficient for a satisfactory regeneration especially when the spare wheel has a large air volume. A further advantage of the invention is that, during a fill-up operation of the spare wheel, the compressor s well as the compressed air reservoir are not connected to the atmosphere. For this reason, the compressor and the compressed air reservoir pump exclusively into the spare wheel and a "lost pumping" into the atmosphere does not occur.

BRIEF DESCRIPTION OF THE DRAWING

An embodiment and additional advantages of the invention are explained in connection with the following figures and FIGS. 1 to 5 each show a level control system having a compressed air reservoir and a tire fill connection.

DESCRIPTION OF THE PREFERRED EMBODIMENTS OF THE INVENTION

Figure 1:
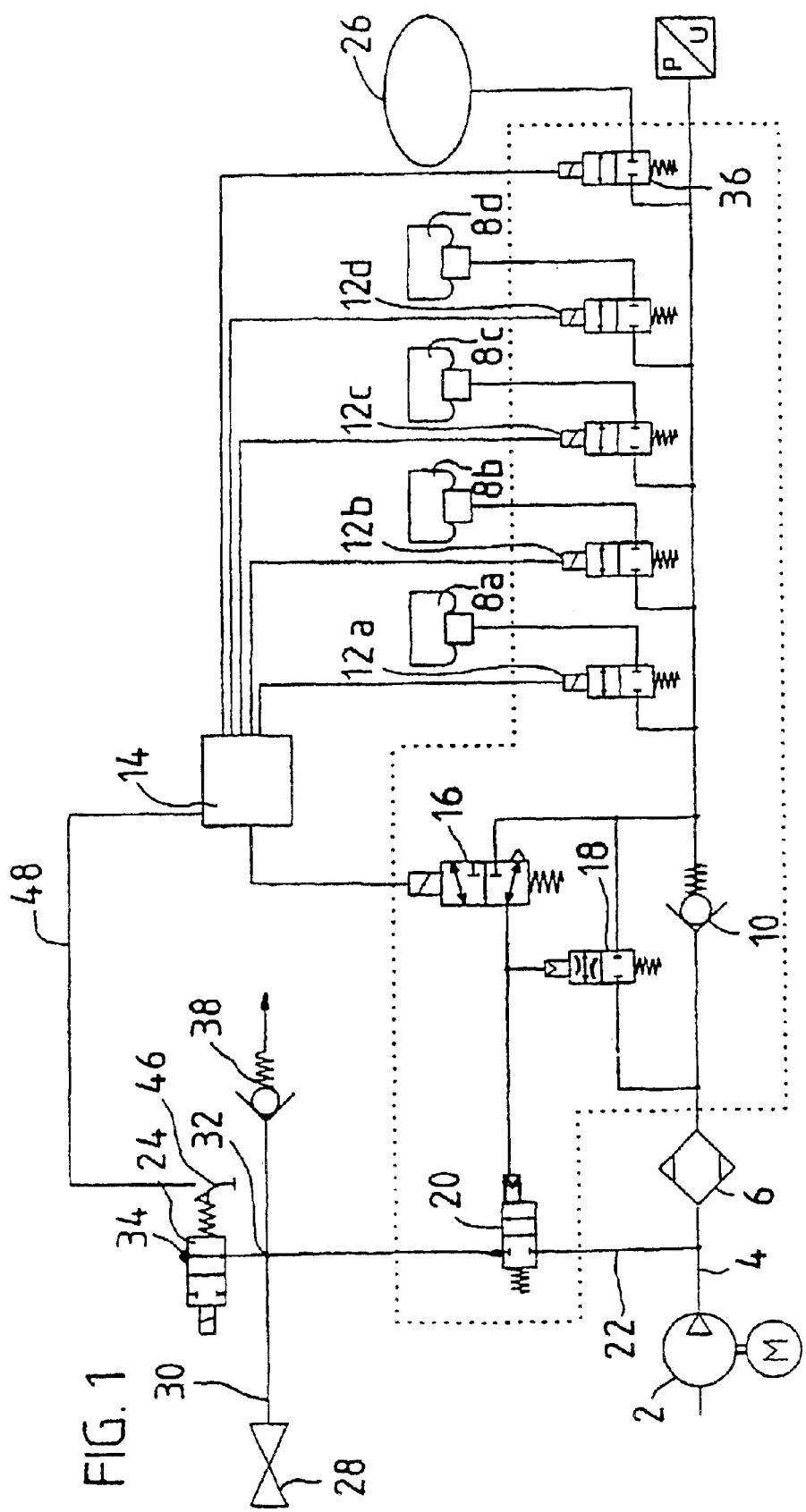

FIG. 1 shows a level control system having a compressor 2 which is connected via a compressed air line 4 to an air dryer 6. Each air spring 8a to 8d of the level control system can be filled with compressed air with the aid of the compressor 2 via the air dryer 6 and a check valve 10 and via an electrically controllable directional valve 12a to 12d. The electrical controllable directional valves are assigned to corresponding ones of the air springs and the check valve 10 opens toward the air springs 8a to 8d. For the above purpose, the directional valve 12a to 12d, which is assigned to the respective air spring 8a to 8d, which is to be filled, is driven by the control unit 14 of the level control system and is transferred from the base state shown in FIG. 1 into the other switching state. Furthermore, the compressor 2 is driven by the control unit so that the compressor starts to run.

For discharging an air spring (8a to 8d), the corresponding directional valve (12 to 12d) is, in turn, transferred by the control unit 14 from the base state into its switched state. Furthermore, the electrically controllable directional valve 16 is transferred by the control unit 14 from the base state shown in FIG. 1 into its switched state. Compressed air reaches the pneumatic control inputs of the pneumatically controllable directional valves 18 and 20 from the air spring (8a to 8d) via the directional valve 16 so that the directional valves 18 and 20 are transferred from the base position shown in FIG. 1 into their switched position. The compressed air line 22 branches from the compressed air line 4 and is connected to the atmosphere via the pneumatically controllable directional valve 20 and via the controllable directional valve 24 (the function of valve 24 will be explained later). Air spring (8a to 8d) can then be discharged into the atmosphere via the directional valve (12a to 12d), the pneumatically controllable directional valve 18, which bridges the check valve 10, the air dryer 6, the pneumatically controllable directional valve 20 and the controllable directional valve 24.

In addition to the components mentioned up to now, the level control system includes a compressed air reservoir 26. This reservoir can be filled with compressed air with the aid of the compressor via the air dryer 6, the check valve 10 and the electrically controllable directional valve 36. For this purpose, the electrically controllable directional valve 36 is transferred by the control unit 14 from the base state shown in FIG. 1 into the switched state and the compressor 2 is driven so that the latter starts running.

Furthermore, the level control system includes a tire fill connection 28, which is in a compressed air line 30. The compressed air line 30 branches from the compressed air line 22 (and therewith indirectly from the compressed air line 4) at a point 32, which lies between the pneumatically controllable directional valve 20 and the controllable directional valve 24.

In the case of need, a spare wheel (not shown) can be connected to the tire fill connection 28 and the spare wheel can then be filled as follows. First, the controllable directional valve 24 is transferred from the base state shown in FIG. 1 into a switched state for filling the reserve wheel in which it blocks the output 34 of the compressed air line 22 to the atmosphere. The transfer of the directional valve 24 into its switched state takes place by the driver of the motor vehicle. For this purpose, the directional valve 24 is either configured as an electrically controllable directional valve and is driven, for example, via a switch in the dashboard of the vehicle. Alternatively, it is possible to configure the directional valve 24 as a directional valve which is to be actuated mechanically so that, with the aid of a switch lever, et cetera, the directional valve is transferred into its switched state (a corresponding configuration is also possible in all other embodiments).

With the transfer into the switched state, the controllable directional valve 24 automatically closes a switch 4 whereupon a signal is outputted via the signal line 48 to the control unit 14 of the level control system. When the control unit 14 receives this signal, it controls the electrically controllable directional valves 16 and 36 so that they transfer from the base state shown in FIG. 1 into the switched state. The pneumatic control inputs of the pneumatically controlled directional valves 18 and 20 are then connected via the directional valves 36 and 16 to the compressed air reservoir 26 so that these directional valves transfer from the base state shown in FIG. 1 into their switched state. The check valve 10 is then bridged by the directional valve 18 and the compressed air line 22 is cleared. In this way, it is possible that compressed air from the compressed air reservoir 26 reaches the spare wheel via the directional valve 36, the directional valve 18 (that is, in the level control system of FIG. 1, the directional valve 18 assumes the function of the tire fill valve and simultaneously the function of the discharge valve), the air dryer 6, the directional valve 20 and via the tire fill connection 28.

At the same time, a filling of the spare wheel with the aid of the compressor 2 is possible via the directional valve 20 and the tire fill connection 28. For this purpose, the compressor 2 is driven by the control unit 14. Only compressed air is filled into the spare wheel from the compressed air reservoir 26 and with the aid of the compressor 2 because the output of the compressed air line 22 is blocked to the atmosphere by the directional valve 24 (that is, the controllable directional valve 24 in the level control system of FIG. 1 assumes the function of a cutoff valve.

The compressed air line 30 includes a check valve 38 at its end lying opposite the tire fill connection 28. The check valve 38 opens toward the atmosphere. The reset force of this check valve 38 is so adjusted that it opens at a specific fill pressure in the spare wheel so that the compressor 2 and the compressed air reservoir 26 then pump into the atmosphere. In this way, damage to the spare wheel and the compressed air lines is precluded.

When the fill-up operation of the spare wheel is completed, then the directional valve 24 is again transferred into its switching state shown in FIG. 1 (by the once-again actuation of the switch in the dashboard or of the mechanical lever). Thereupon, the switch 46 opens and no signal is given to the control unit 14 anymore which indicates a filling of the spare wheel. The control unit 14 then no longer supplies current to the control inputs of the directional valves 36 and 16 so that these valves again transfer from their switched state into the base position shown in FIG. 1. With the transfer of the directional valve 16 into its base state, the pneumatic control inputs of the pneumatic directional valves 18 and 20 are connected to the atmosphere so that they also transfer again into their base state.

In the embodiment shown in FIG. 1, the air pressure in the level control system is not applied to the tire fill connection 28 and to the check valve 38 when the directional valve 20 is in its base state shown in FIG. 1. This affords the advantage that, during the fill-up of an air spring 8a to 8d or of the compressed air reservoir 26 with the aid of the compressor 2, the pressure generated by the compressor is not applied to the tire fill connection 28 and to the check valve 38.

Figure 2:
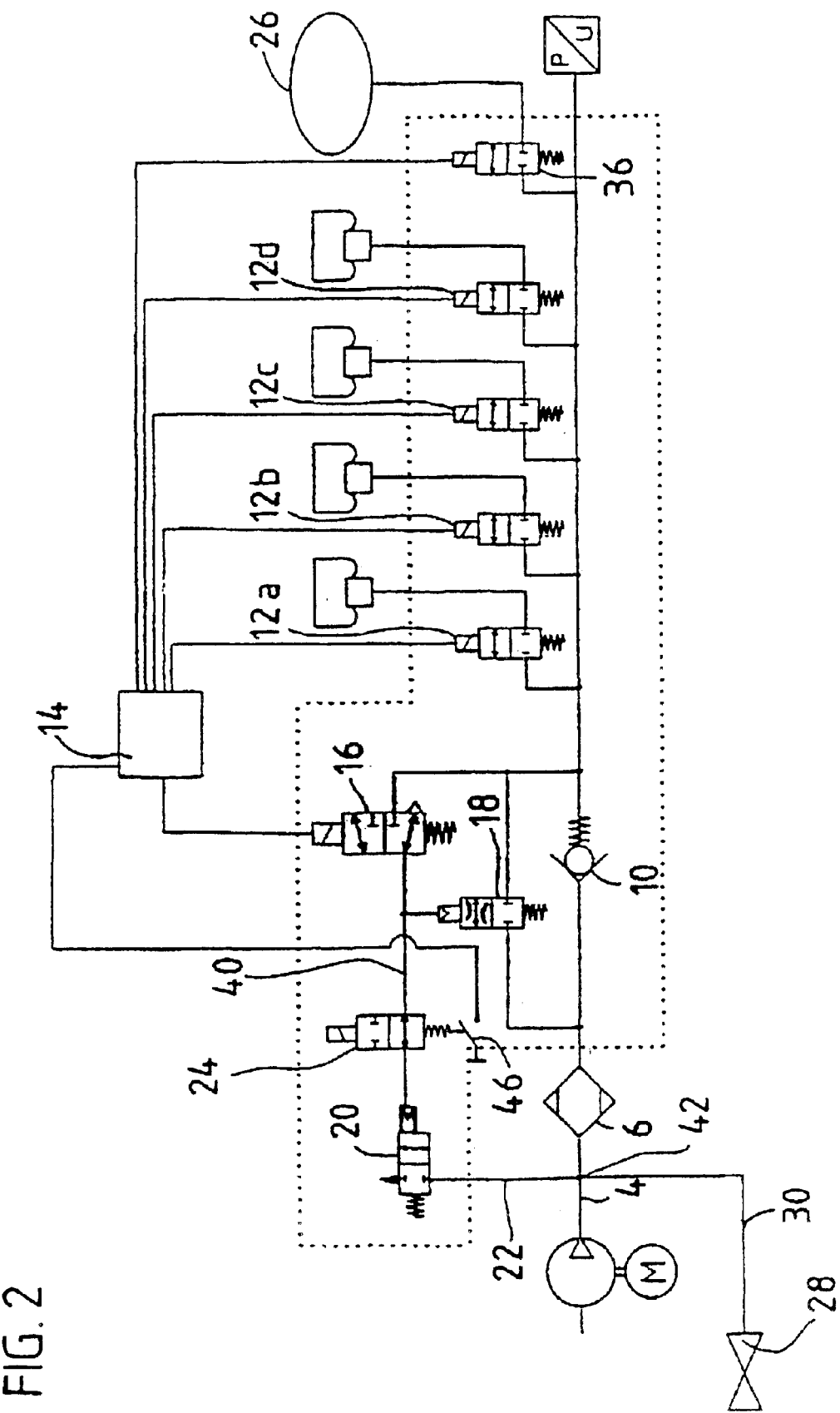

FIG. 2 shows a level control system which is configured substantially the same as the level control system shown in FIG. 1. For this reason, only the differences of the level control system with respect to FIG. 1 are explained in the following. In the level control system of FIG. 2, the controllable directional valve 24 lies in the compressed air line 40 which connects the electrically controllable directional valve 16 to the pneumatically controllable directional valve 20. Furthermore, the compressed air line 30 branches from the compressed air line 4 at point 42 and contains the tire fill connection 28 and a check valve (not shown).

A spare wheel can be connected to the tire fill connection 28 and the tire can then be filled with the aid of the level control system as described below. First, the controllable directional valve 24 is transferred from the base state shown in FIG. 2 wherein it clears the compressed air line 40 into its switched state wherein it interrupts the compressed air line 40. In its switched state, the directional valve 24 closes the switch 46 so that a signal is conducted to the control unit 14 of the level control system. When the control unit receives this signal, it controls the directional valves 36 and 16 so that they transfer from the base position shown in FIG. 2 into their switched state. The compressed air reservoir 26 is then connected to the pneumatic control input of the pneumatically controllable directional valve 18 via the directional valve 36 and the directional valve 16 so that the directional valve 18 transfers from the base state a shown in FIG. 2 into its switched state wherein the valve 18 bridges the check valve 10. The compressed air reservoir 26 is then connected to the spare wheel via the directional valve 36, the directional valve 18 (that is, in the level control system of FIG.

2, the directional valve 18 assumes the function of the tire fill valve and simultaneously the function of the discharge valve), the air dryer 6 and the tire fill connection 28. Accordingly, the spare wheel can be filled with the aid of the compressed air reservoir 26. At the sine time, the spare wheel can be filled with the aid of the compressor 2 because the compressor 2, via the tire fill connection 28, is likewise connected to the spare wheel. Since the compressed air line 40 is interrupted by the directional valve 24, the air pressure in the compressed air reservoir 26 does not reach the pneumatic control input of the pneumatically controllable directional valve 20 during filling of the spare wheel so that the directional valve 20 remains in the base state shown in FIG. 2 during the fill-up operation and blocks the outlet of the compressed air line 22 to the atmosphere (that is, the controllable directional valve 24 assumes in the level control system of FIG. 2 the function of a cutoff valve. For this reason, the compressor 2 and the compressed air reservoir 26 pump exclusively into the spare wheel and a "loss pumping" into the atmosphere does not occur.

When the fill-up operation of the spare wheel is completed, then the procedure continues as already explained with respect to FIG. 1.

Figure 3:
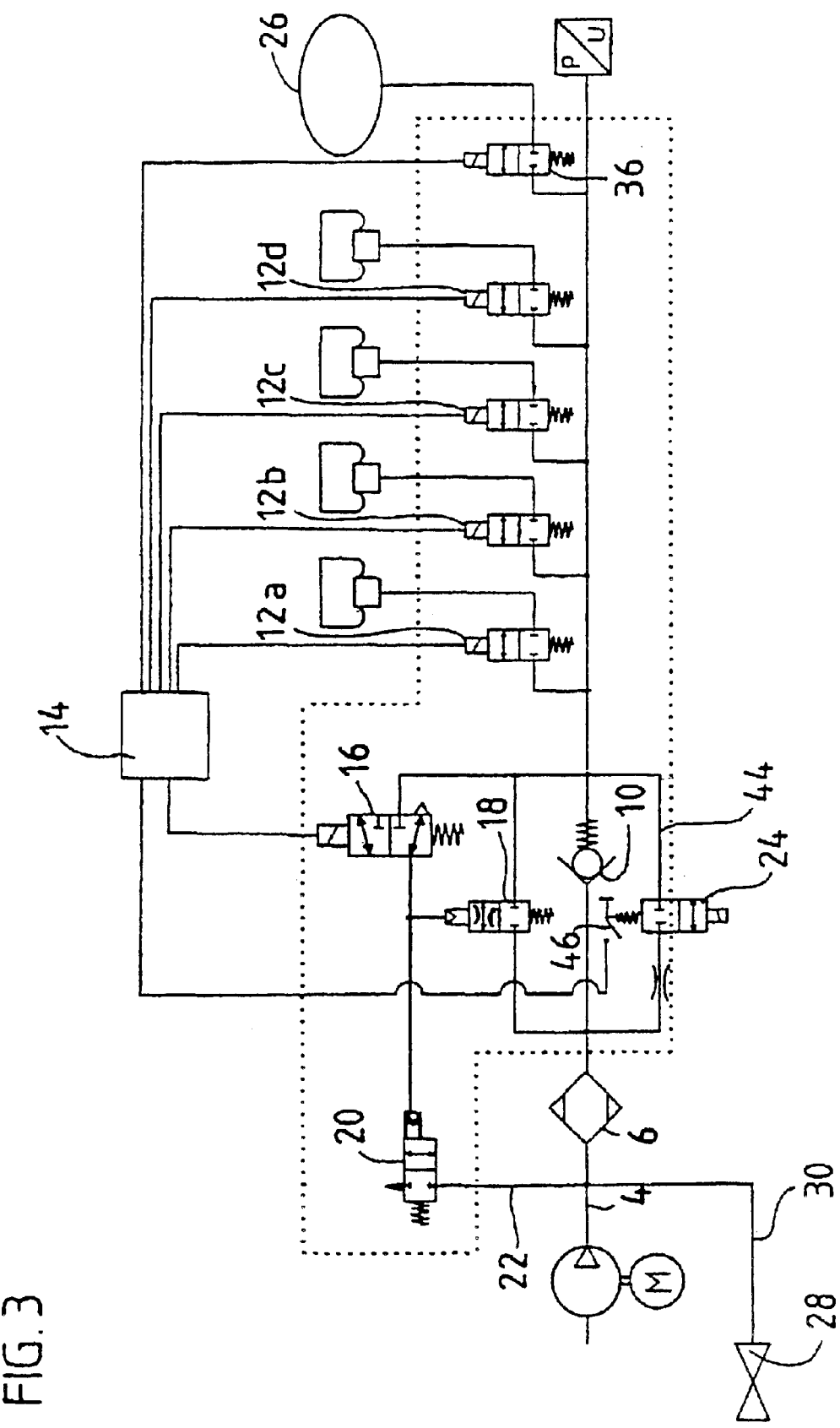

FIG. 3 shows a level control system, which is built up substantially as the level control system shown in FIG. 2, only the directional valve 24 is mounted elsewhere. The directional valve 24 is mounted in a compressed air line 44. In the base state shown in FIG. 3, the directional valve 24 blocks the compressed air line 44 and, in the switched state, the directional valve 24 clears the compressed air line 4 so that the check valve 10 is then bridged by the directional valve 24. In the following, it will be explained how, with the aid of the level control system, a spare wheel can be filled which is connected to the tire fill connection 28. First, the directional valve 24 is transferred from the base state shown in FIG. 3 into the switched state (by actuating the switch in the dashboard or by actuating the mechanical lever) so that the compressed air line 44 is cleared and the check valve 10 is bridged. With the transfer of the directional valve 24 into its switch state, the switch 46 is closed so that a signal is transmitted with the control unit 14 of the level control system. When the control unit 14 receives this signal, it drives the direction 1 valve 36 so that this valve transfers from the base state shown in FIG. 3 into the switched state. The compressed air reservoir 26 is then connected to the spare wheel via the directional valve 36, the directional valve 24 (that is, the directional valve 4 assumes in the level control system of FIG. 3 the function of the tire fill valve; the function of the discharge valve is, in contrast, assumed by the pneumatically controllable directional valve 18), the air dryer 6 and the tire fill connection 28. Furthermore, the compressor 2 is connected via the tire fill connection to the spare wheel so that the spare wheel can be filled from the compressed air reservoir 26 as well as with the aid of the compressor 2. No "loss pumping" takes place via the compressed air line 22 into the atmosphere because, during the filling of the a re wheel, the directional valve 16 is not driven by the control unit 14 so that the directional valve 16 remains in its base state. Correspondingly, the pneumatically controllable directional valves 18 and 20 remain in their base state shown in FIG. 3 so that the pneumatically controllable directional valve 20 blocks the connection of the compressed air line 22 to the atmosphere (that is. the pneumatically controllable directional valve 20 assumes in the level control system of FIG. 3 simultaneously the function of the first directional valve and the function of a cutoff valve).

When the fill operation is to be ended, the switch valve 24 is transferred again into its base state shown in FIG. 3 so that no signal can reach the control unit 14 anymore. The control unit 14 thereupon supplies no more current to the control input of the directional valve 36 so that this valve again transfers into its base state shown in FIG. 3.

Figure 4:
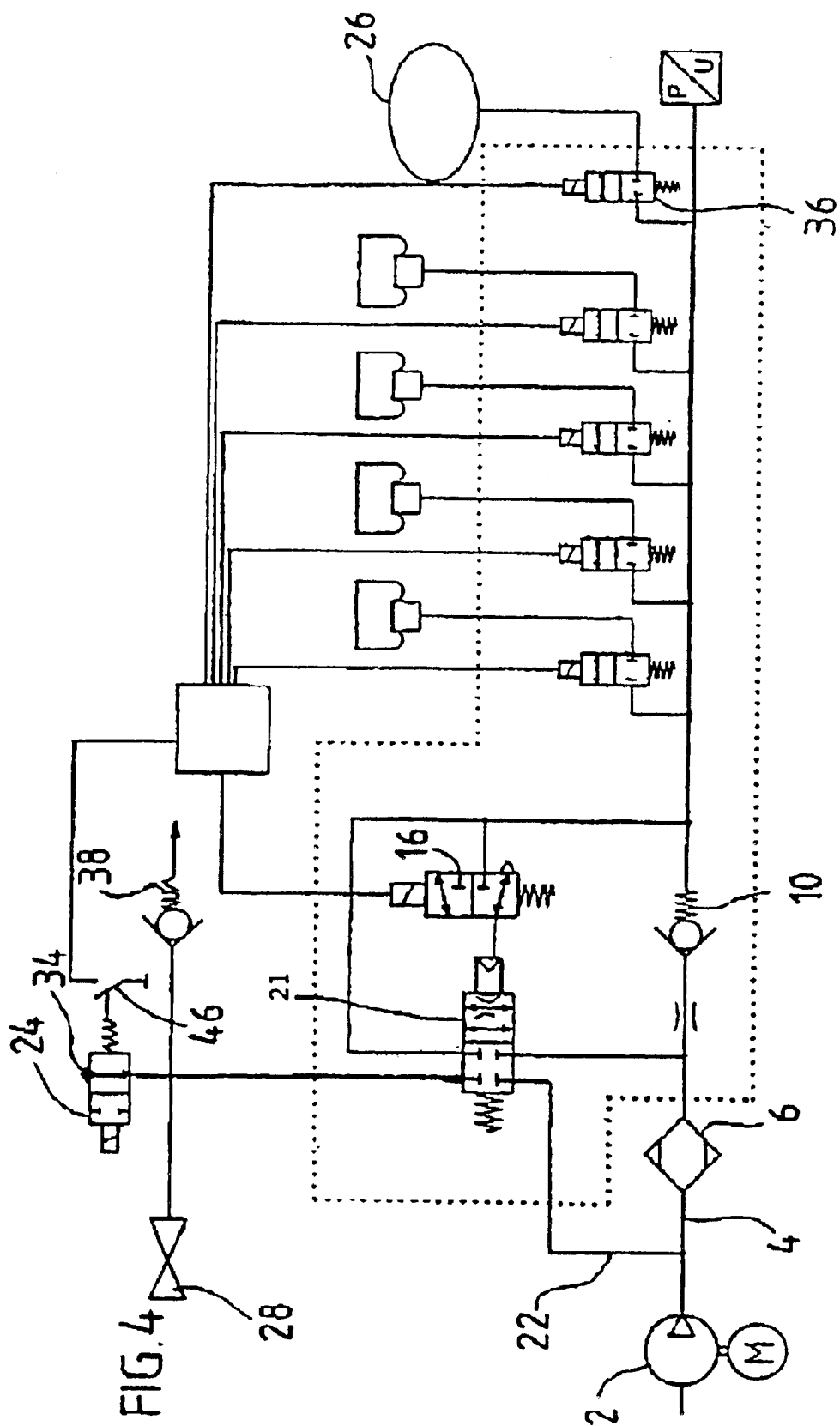

FIG. 4 shows a level control system wherein the pneumatically controllable directional valves 18 and 20 are combined into a single Pneumatically controllable directional valve 21. Apart from this difference, the level control system shown in FIG. 4 is built up in the game way as the level control system shown in FIG. 1.

A spare wheel is connected to the tire fill connection 28 and is filled with the aid of the level control system as follows. First, the controllable directional valve 24 is transferred from its base state shown in FIG. 4 into its switched state whereby it closes switch 46. With the closure of the switch, a signal is outputted to the control unit 14 of the level control system which thereupon supplies current to the control inputs of the electric directional valves 36 and 16 which, thereupon, transfer from the base state shown in FIG 4 into their switched state. The compressed air reservoir 6 is then connected to the pneumatic control input of the pneumatically controllable directional valve 21 via the directional valve 36 and the directional valve 16 so that the directional transfers from the base state shown in FIG. 4 into its switched state. In this switched state, the directional valve 21 bridges the check valve 10 and simultaneously switches the compressed air line 22 clear which connects from the compressed air line 4 the compressor 2 to the air dryer 6. The compressed air reservoir 26 is then connected to the spare wheel via the directional valve 36, the pneumatic direction (that is, the pneumatically controllable directional valve 21 assumes in the level control system of FIG. 4 the function of the first directional valve mentioned in claim 1 and further assumes the function of the discharge valve and the function of the tire fill valve), the air dryer 6 and the tire fill connection 28. The spare wheel is likewise connected to the compressor 2 via the pneumatically controllable directional valve 21 and the tire fill connection 28 so hat the spare wheel can be simultaneously filled by the compressor 2 and by the compressed air reservoir 26. During the fill up operation, a "loss pumping" into the atmosphere is prevented because the directional valve 24 blocks the connection of the compressed air line 22 to the atmosphere (that is, the directional valve 24 assumes in the level control system of FIG. 4 the function of a cutoff valve.

To end the fill-up operation, the check valve 24 is again transferred into the base state shown in FIG. 4.

In the embodiment shown in FIG. 4, the air pressure in the level control system is not applied to the tire fill connection 28 as well as to the check valve 38 when the directional valve 20 is disposed in its base state shown in FIG. 1. This affords the advantage that, during filling of an air spring 8a to 8d or of the compressed air reservoir 26 with the aid of the compressor 2, the pressure, which is generated by the compressor, is not applied to the tire fill connection 28 and to the check valve 38.

Figure 5:
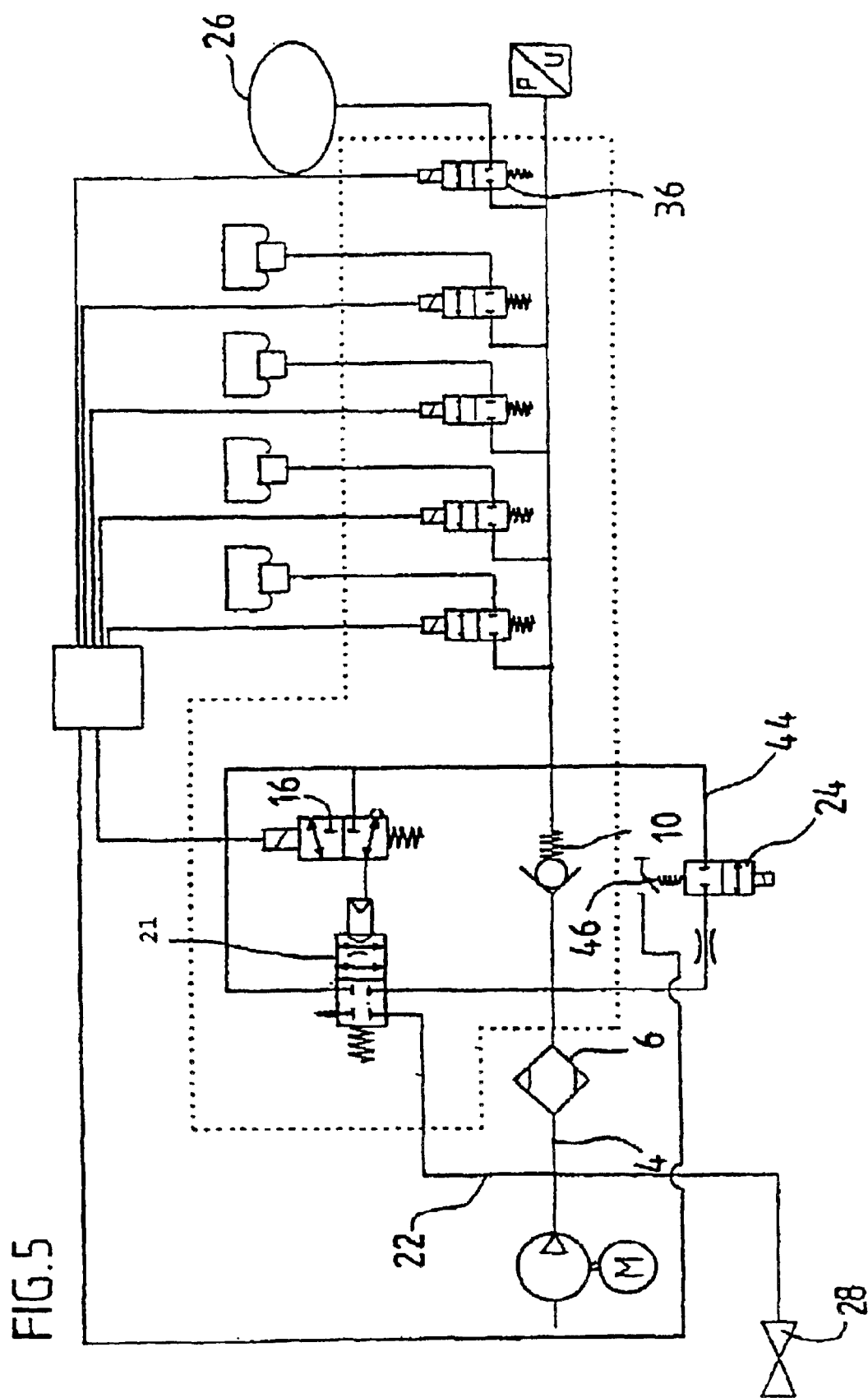

FIG. 5 shows an embodiment wherein the pneumatic directional valves 18 and 20 are combined to one valve 21 exactly as in the embodiment of FIG. 4. The directional valve 24 and the tire fill connection 28 have the same arrangement which was explained in connection with FIG. 3 so that reference is made to the description of the figures corresponding thereto (in he level control system of FIG. 5, the pneumatically controllable directional valve 21 assumes the function of the first pneumatically controllable directional valve and of the discharge valve and the directional valve 24 assumes the function of the tire fill valve).

REFERENCE NUMERAL LIST 2 compressor
4 compressed air line
6 air dryer
8a to 8d air springs
10 check valve
12a to 12d directional valve
14 control unit
16 directional valve
18, 20 pneumatically controllable directional valve
22 compressed air line
24 directional valve
26 compressed air reservoir
28 tire fill connection
30 compressed air line
32 point
34 output
36 directional valve
38 check valve
40 compressed air line
42 point
44 compressed air line
46 switch
48 signal line

What is claimed is:

1. A level control system for vehicle including a vehicle body and at least one wheel axle, the level control system comprising:
    a plurality of air springs which can be filled or discharged with compressed air and are mounted for suspending said vehicle body relative to said vehicle axle;
    a first compressed air line;
    a compressor and an air dryer connected to each other by said first compressed air line;
    a check valve connected to said air springs so as to open toward said air springs;
    each of said air springs being connectable to said compressor via said air dryer and said check valve for filling said air springs;
    a second compressed air line branching off from said first compressed air line and containing a first pneumatically controllable directional valve;
    said first pneumatically controllable directional valve being switchable between a first switched position wherein said second compressed air line is connected to the atmosphere and a second switched position wherein said second compressed air line is blocked to the atmosphere;
    said air springs having a pneumatically controllable discharge valve associated therewith which can bridge said check valve and each of said air springs being connectable to the atmosphere via said pneumatically controllable discharge valve, said air dryer and said first pneumatically controllable directional valve whereby control inputs of each of said discharge valve and said first pneumatically controllable directional valve are selectively charged with the pressure in at least one air spring;
    a third compressed air line branching off said first compressed air line or said second compressed air line and containing a tire fill connection;
    a switchable tire fill valve which can bridge said check valve;
    a compressed air reservoir mounted in said level control system so as to cause a reserve wheel connected to said tire fill connection to be fillable with Compressed air from said compressed air reservoir via said switchable tire fill valve and said air dryer whereby said second compressed air line is then blocked with respect to the atmosphere; and,
    a cutoff valve switchable between a first position wherein one of said air springs is discharged end said second compressed air line is open to the atmosphere and a second position wherein said compressed air reservoir is connected with said tire fill connection and an opening of said second compressed air line to the atmosphere is prevented.

2. The level control system of claim 1, wherein the functions of said pneumatically controllable discharge valve end said tire fill valve of claim 1 are combined into one switchable valve;
    the pneumatic control input of said first pneumatically controllable directional valve is, for discharging one of said air springs, charged with the pressure in at least one air spring and is, for filling said reserve wheel, charged with the pressure in the compressed air reservoir so that said first pneumatically controllable directional valve assumes the same switching position during discharge of one of said air springs and during the filling of said reserve wheel;
    said cutoff valve lies in the second compressed air line and connects the second compressed air line to the atmosphere in its first switching position and, in its second switching position, the second compressed air line is blocked to the atmosphere; and,
    said tire fill connection lies in said third compressed air line which branches from a part of said second compressed air line which connects said first pneumatically controllable directional valve to said cutoff valve.

3. The level control system o claim 2, wherein said system further comprises a control unit, and, wherein, with the transfer of said cutoff valve into the second position, a signal is outputted to said control unit and said control unit causes a connection of the compressed air reservoir to said reserve wheel connected to said tire fill connection after receiving the signal.

4. The level control system of claim 1, wherein
    the functions of said discharge valve and said tire fill valve of claim 1 are combined into a switchable valve;
    the pneumatic control input of the first pneumatically controllable directional valve is charged with the pressure in said at least one air spring or with the pressure in the compressed air reservoir;
    said cutoff valve, in its first position, makes possible charging the control input of said first pneumatically controllable directional valve with the pressure in said at least one air spring; and,
    in its second position, said cutoff valve prevents the charge of the control input of said first pneumatically controllable directional valve with the pressure in said compressed air reservoir.

5. The level control system of claim 1, wherein:
    said discharge valve and the tire fill valve are configured as separate valves;
    the functions of said first pneumatically controllable directional valve and said cutoff valve of claim 1 are combined into a single valve.

6. The level control system o claim 5, wherein said system further comprises a control unit; and, wherein, with the transfer of the tire fill valve into a switched position in which said check valve is bridged, a signal is outputted to said control unit and said control unit, after receiving the signal, triggers a connection of the compressed air reservoir to said reserve wheel connected to said tire fill connection.

7. The level control system of claim 1, wherein said third compressed air line has a check valve which connects said third compressed air line to the atmosphere when the fill pressure in said reserve wheel exceeds a limit value.

8. The level control system of claim 1, wherein the function of the switchable tire fill valve is combined into one valve with the first pneumatically controllable directional valve or said pneumatically controllable discharge valve and wherein an electrically controllable directional valve allows for transfer of compressed air from said air springs to said tire fill valve.

* * * * *

UNITED STATES PATENT AND TRADEMARK OFFICE
CERTIFICATE OF CORRECTION

PATENT NO. : 6,824,145 B2
APPLICATION NO. : 10/240823
DATED : November 30, 2004
INVENTOR(S) : Christof Behmenburg It is certified that error appears in the above-identified patent and that said Letters Patent is hereby corrected as shown below:

In column 1:
Line 42: delete "ti e" and substitute -- tire -- therefor.
Line 58: delete "wit" and substitute -- with -- therefor.

In column 2:
Line 4: delete "he" and substitute -- the -- therefor.
Line 11: delete "pare" and substitute -- spare -- therefor.
Line 12: delete "dryer." and substitute -- dryer, -- therefor.
Line 23: delete "s" and substitute -- as -- therefor.

In column 3:
Line 42: delete "switch 4" and substitute -- switch 46 -- therefor.

In column 4:
Line 4: delete "valve." and substitute -- valve). -- therefor.
Line 63: delete "a" before "shown".

In column 5:
Line 5: delete "sine" and substitute -- same -- therefor.
Line 17: delete "valve." and substitute -- valve). -- therefor.
Line 30: delete "line 4" and substitute -- line 44 -- therefor.
Line 40: delete "switch" and substitute -- switched -- therefor.
Line 41: delete "with" and substitute -- to -- therefor.
Line 43: delete "direction 1" and substitute -- directional -- therefor.
Line 47: delete "valve 4" and substitute -- valve 24 -- therefor.
Line 57: delete "a re" and substitute -- spare -- therefor.
Line 63: delete "is." and substitute -- is, -- therefor.

In column 6:
Line 9: delete "Pneumatically" and substitute -- pneumatically -- therefor.
Line 11: delete "game" and substitute -- same -- therefor.
Line 22: delete "reservoir 6" and substitute -- reservoir 26 -- therefor.
Line 26: -- valve 21 -- should be inserted after "directional".
Line 32: delete "direction" and substitute -- directional valve 21 -- therefor.
Line 40: delete "hat" and substitute -- that -- therefor.
Line 42: delete "fill up" and substitute -- fill-up -- therefor.
Line 47: delete "valve." and substitute -- valve). -- therefor.
Line 66: delete "he" and substitute -- the -- therefor.

UNITED STATES PATENT AND TRADEMARK OFFICE
CERTIFICATE OF CORRECTION

PATENT NO. : 6,824,145 B2
APPLICATION NO. : 10/240823
DATED : November 30, 2004
INVENTOR(S) : Christof Behmenburg It is certified that error appears in the above-identified patent and that said Letters Patent is hereby corrected as shown below:

In column 7:
Line 30: -- a -- should be inserted before the first "vehicle".

In column 8:
Line 5: delete "Compressed" and substitute -- compressed -- therefor.
Line 11: delete "end" and substitute -- and -- therefor.
Line 19: delete "end" and substitute -- and -- therefor.
Line 39: delete "o" and substitute -- of -- therefor.
Line 40: delete "unit," and substitute -- unit; -- therefor.

In column 9:
Line 1: delete "o" and substitute -- of -- therefor.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 6,824,145 B2
APPLICATION NO. : 10/240823
DATED : November 30, 2004
INVENTOR(S) : Christof Behmenburg It is certified that error appears in the above-identified patent and that said Letters Patent is hereby corrected as shown below:

In column 1:
Line 42: delete "ti e" and substitute -- tire -- therefor.
Line 58: delete "wit" and substitute -- with -- therefor.

In column 2:
Line 4: delete "he" and substitute -- the -- therefor.
Line 11: delete "pare" and substitute -- spare -- therefor.
Line 12: delete "dryer." and substitute -- dryer, -- therefor.
Line 23: delete "s" and substitute -- as -- therefor.

In column 3:
Line 42: delete "switch 4" and substitute -- switch 46 -- therefor.

In column 4:
Line 4: delete "valve." and substitute -- valve). -- therefor.
Line 63: delete "a" before "shown".

In column 5:
Line 5: delete "sine" and substitute -- same -- therefor.
Line 17: delete "valve." and substitute --valve). -- therefor.
Line 30: delete "line 4" and substitute -- line 44 -- therefor.
Line 40: delete "switch" and substitute -- switched -- therefor.
Line 41: delete "with" and substitute -- to -- therefor.
Line 43: delete "direction 1" and substitute -- directional -- therefor.
Line 47: delete "valve 4" and substitute -- valve 24 -- therefor.
Line 57: delete "a re" and substitute -- spare -- therefor.
Line 63: delete "is." and substitute -- is, -- therefor.

In column 6:
Line 9: delete "Pneumatically" and substitute -- pneumatically -- therefor.
Line 11: delete "game" and substitute -- same -- therefor.
Line 22: delete "reservoir 6" and substitute -- reservoir 26 -- therefor.
Line 26: -- valve 21 -- should be inserted after "directional".
Line 32: delete "direction" and substitute -- directional valve 21 -- therefor.
Line 40: delete "hat" and substitute -- that -- therefor.
Line 42: delete "fill up" and substitute -- fill-up -- therefor.
Line 47: delete "valve." and substitute --valve). -- therefor.
Line 66: delete "he" and substitute -- the -- therefor.

In column 7:
Line 30: -- a -- should be inserted before the first "vehicle".

UNITED STATES PATENT AND TRADEMARK OFFICE
CERTIFICATE OF CORRECTION

PATENT NO. : 6,824,145 B2
APPLICATION NO. : 10/240823
DATED : November 30, 2004
INVENTOR(S) : Christof Behmenburg It is certified that error appears in the above-identified patent and that said Letters Patent is hereby corrected as shown below:

In column 8:
Line 5: delete "Compressed" and substitute -- compressed -- therefor.
Line 11: delete "end" and substitute -- and -- therefor.
Line 19: delete "end" and substitute -- and -- therefor.
Line 39: delete "o" and substitute -- of -- therefor.
Line 40: delete "unit," and substitute -- unit; -- therefor.

In column 9:
Line 1: delete "o" and substitute -- of -- therefor.

Signed and Sealed this

Twenty-seventh Day of March, 2007

JON W. DUDAS
*Director of the United States Patent and Trademark Office*